United States Patent
Huang et al.

(10) Patent No.: US 9,667,122 B1
(45) Date of Patent: May 30, 2017

(54) BRUSHLESS D.C. MOTOR WITH IMPROVED ROTOR MAGNET POSITION SENSING

(71) Applicants: Su Shiong Huang, Bellevue, WA (US); Shengbo Zhu, San Jose, CA (US)

(72) Inventors: Su Shiong Huang, Bellevue, WA (US); Shengbo Zhu, San Jose, CA (US)

(73) Assignee: SILICON VALLEY MICROM CORPORATION, San Jose, CA (US)

( * ) Notice: Subject to any disclaimer, the term of this patent is extended or adjusted under 35 U.S.C. 154(b) by 0 days.

(21) Appl. No.: 14/757,164

(22) Filed: Nov. 27, 2015

(51) Int. Cl.
| | | |
|---|---|---|
| *H02P 6/06* | (2006.01) | |
| *G05D 1/02* | (2006.01) | |
| *H04Q 9/00* | (2006.01) | |
| *H02K 11/00* | (2016.01) | |
| *H02P 6/16* | (2016.01) | |

(52) U.S. Cl.
CPC ............ *H02K 11/0015* (2013.01); *H02P 6/16* (2013.01)

(58) Field of Classification Search
CPC ........ H02K 11/20; H02K 11/27; H02K 11/35; H02K 29/08; H02K 16/005; H02K 19/103; H02P 6/14; H02P 2209/07; H02P 25/089; H02P 25/0925; G01R 31/1227; G01R 31/346; B04B 13/003; F16F 15/1292
USPC ...... 318/16, 400.04, 400.06, 400.09, 400.15, 318/400.38
See application file for complete search history.

(56) References Cited

U.S. PATENT DOCUMENTS

| | | | | |
|---|---|---|---|---|
| 4,292,575 A | * | 9/1981 | Kuhnlein | ................... H02P 6/14 318/400.04 |
| 5,220,258 A | * | 6/1993 | Hans | ......................... H02P 6/14 318/400.09 |
| 5,518,493 A | * | 5/1996 | Srinivasan | ............ B04B 13/003 340/671 |
| 5,598,073 A | * | 1/1997 | Hans | ......................... H02P 6/14 318/400.15 |
| 5,598,745 A | * | 2/1997 | Tsuchiya | ............. F16F 15/1292 192/213.11 |
| 6,218,749 B1 | * | 4/2001 | Nondahl | ................. H02K 11/20 310/166 |
| 6,504,275 B2 | * | 1/2003 | Nondahl | ................. H02K 11/20 310/261.1 |
| 6,794,883 B2 | * | 9/2004 | Klingel | ................. G01R 31/346 324/522 |
| 6,864,657 B1 | * | 3/2005 | Lungu | .................. H02K 19/103 318/400.01 |

(Continued)

*Primary Examiner* — Paul Ip (57) ABSTRACT

A brushless D.C. motor has a rotor with a plurality of magnets secured to a mounting surface. Each magnet has an RF transmitter secured to a magnet surface, with each RF transmitter having stored therein a unique identification character serving to identify the magnet. A transmitter power generator having several coils mounted on the rotor and a power conditioning unit supplies power to the transmitters, which continuously broadcast their identification character. A stator has a plurality of pole teeth separated by slots, each pole tooth having a power coil wound thereabout. A plurality of RF receiver antennae are mounted adjacent the pole teeth each coupled to a different RF receiver. The position and magnet identification information received by the RF receiver is processed and coupled to a microprocessor, which extracts the information and sends it to a motor controller and driver unit, which supplies operating power to the individual power coils.

17 Claims, 10 Drawing Sheets

(56) References Cited

U.S. PATENT DOCUMENTS

| | | | |
|---|---|---|---|
| 2001/0008352 A1* | 7/2001 | Nondahl | H02K 11/20 310/68 C |
| 2003/0178999 A1* | 9/2003 | Klingel | G01R 31/346 324/522 |

* cited by examiner

Prior Art

Prior Art

BRUSHLESS D.C. MOTOR WITH IMPROVED ROTOR MAGNET POSITION SENSING

BACKGROUND OF THE INVENTION

This invention relates to brushless D.C. motors used in a variety of applications. More particularly, this invention relates to an improved rotor magnet position sensing technique for such motors using active UHF RF transmitters mounted on the rotor magnets and powered by coils mounted on the motor rotor, and associated transmitter signal processing elements.

Figure 1:
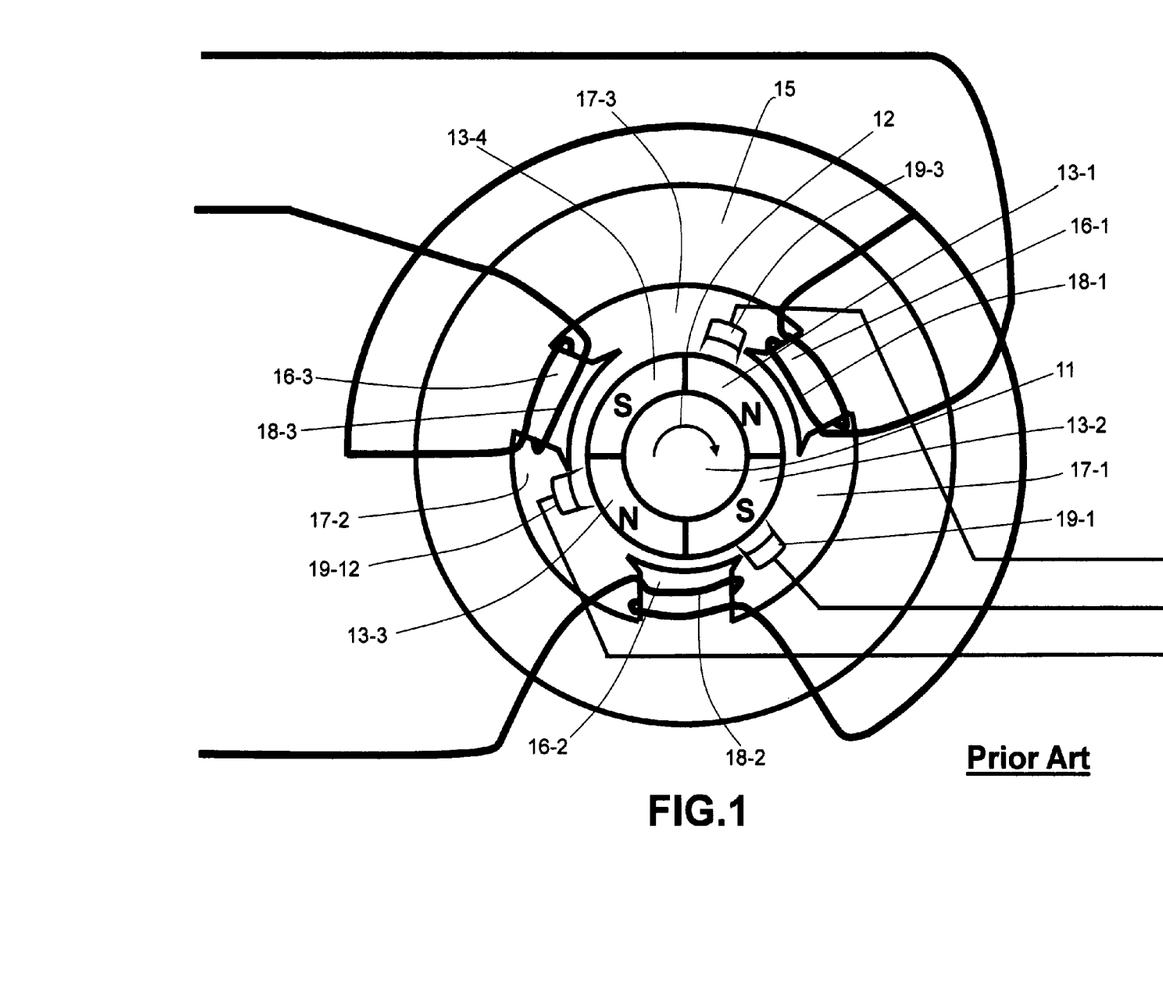
FIG. 1 is a schematic sectional view taken normal to the rotational axis of a known type of brushless D.C. motor using Hall effect sensors.

Brushless D.C. motors are known and are finding increasing use in a wide variety of applications. Such motors rely on switching circuits in the electrical power distribution system to provide the necessary electrical power commutation required to operate the motor. The switching circuits rely on position feedback signals which indicate the rotational position of magnets mounted on the motor rotor to properly time the application of electrical power to the stator coils. The most widely implemented current type of rotor position feedback signal generator uses a plurality of rotor magnet position sensors, usually Hall effect sensors, to provide the necessary rotor magnet position feedback signals. FIG. 1 illustrates an example of a known brushless D.C. motor using Hall effect rotor magnet position sensors. As seen in this Fig., which is a schematic sectional view taken normal to the rotational axis of the motor, a rotor 11 is mounted for rotation in a direction suggested by arrow 12. A plurality of permanent magnets 13-1 . . . 13-4 is secured to the outer surface of rotor 11. The magnets 13-1 . . . 13-4 are arranged in alternating magnetic polarities, such that the north pole of magnet 13-1 is flanked by the south poles of magnets 13-2 and 13-4, the south pole of magnet 13-2 is flanked by the north poles of magnets 13-1 and 13-3, etc. Rotor 11 is concentrically mounted within a stator 15 fabricated from a magnetizable material, such as a laminated stack of steel plates, and having a plurality of pole teeth 16-1 . . . 16-3 and a corresponding plurality of axially extending slots 17-1 . . . 17-3. Power distribution coils 18-1 . . . 18-3 are individually wound about pole teeth 16-1 . . . 16-3, and these coils are connected in a star configuration to the electrical power source shown in FIG. 2. Rotor 11 is caused to rotate by the proper sequential application of electrical power to coils 18-1 . . . 18-3, which generate magnetic fields capable of interacting with the magnetic fields permanently generated by rotor magnets 13-1 . . . 13-4 to provide rotational force to rotor 11.

Figure 2:
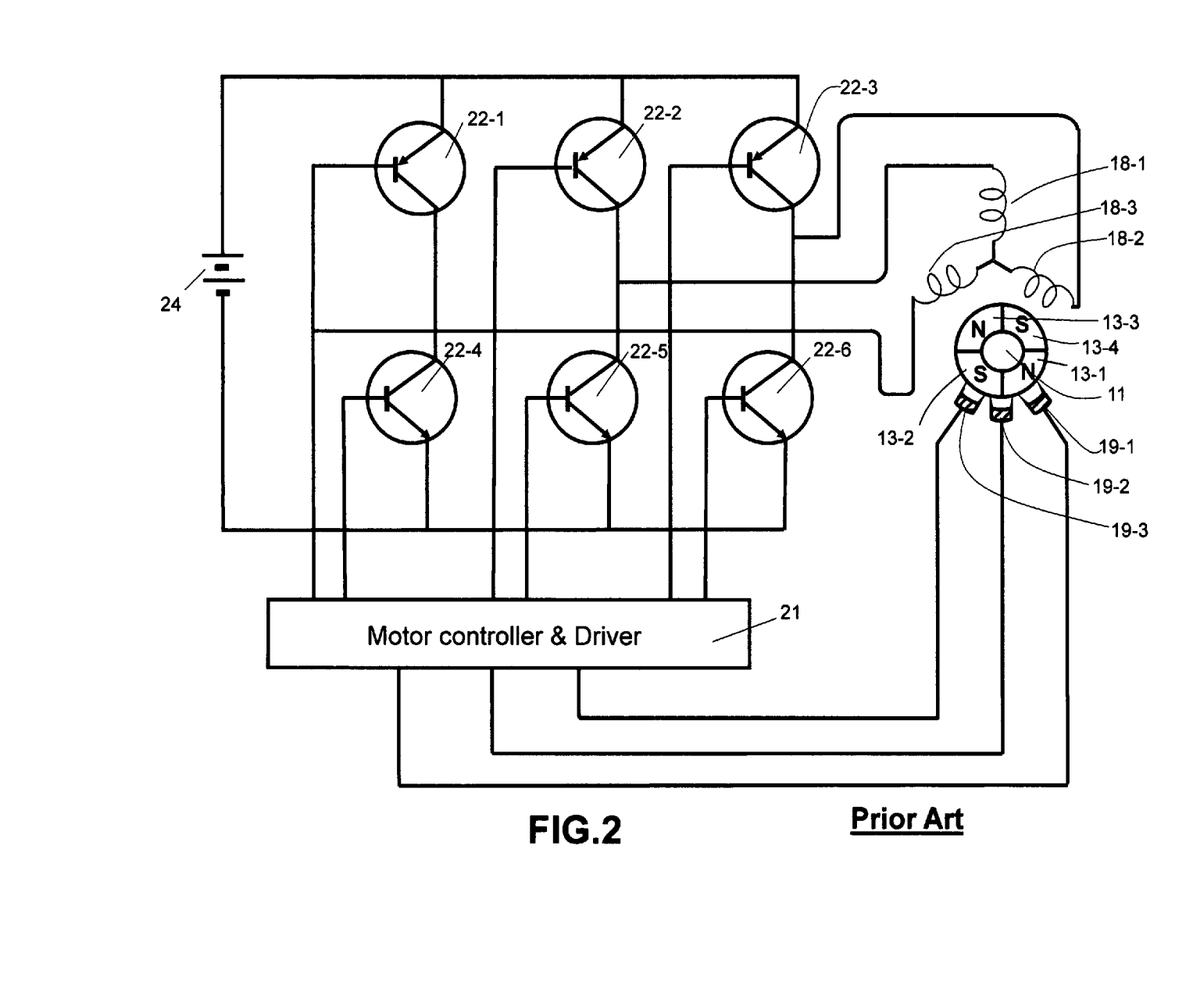
FIG. 2 is a schematic partial block diagram of the power switching and distribution circuitry for the brushless D.C. motor illustrated in FIG. 1.

In the FIG. 1 embodiment, rotor magnet position feedback signals are provided by Hall effect sensors 19-1 . . . 19-3, which use the well-known Hall effect to generate electrical rotor magnet position feedback signals in response to the passage thereby of the magnetic fields generated by rotor magnets 13-1 . . . 13-4. As seen in FIG. 2, which is a schematic partial block diagram of the power switching and distribution circuitry for the brushless D.C. motor illustrated in FIG. 1, the rotor magnet position feedback signals generated by sensors 19-1 . . . 19-3 are coupled to a motor controller and driver unit 21. Unit 21 incorporates a microcontroller which processes these feedback signals and uses the positioning information contained therein to control the operation of a bank of power switching transistors 22-1 . . . 22-6 connected as shown, which are used to apply electrical power from a D.C. source (illustrated as a battery 24) to the stator coils 18-1 . . . 18-3. By properly sequencing the application of electrical power to coils 18-1 . . . 18-3, the rotor 11 is caused to rotate at the desired speed, thereby operating the motor. Further information regarding the structure, function and operating characteristics of brushless D.C. motors using Hall effect rotor magnet positioning sensors can be found in the following U.S. Patents, the disclosures of which are hereby incorporated by reference: U.S. Pat. No. 6,819,068 issued Nov. 16, 2004; U.S. Pat. No. 6,934,468 issued Aug. 23, 2005; U.S. Pat. No. 6,941,822 issued Sep. 13, 2005; and U.S. Pat. No. 6,954,042 issued Oct. 11, 2005.

Although brushless D.C. motors equipped with Hall effect rotor magnet position feedback sensors have been widely implemented in the past, certain disadvantages exist with this design configuration. Firstly, the operating characteristics of Hall effect sensors are temperature dependent. Consequently, in applications requiring more than a minimum of precision some means of compensating for the operating characteristics temperature dependency must be incorporated into the motor controller and driver unit 21. At the very least, this requires the addition of a temperature sensing element adjacent the Hall effect sensors, and special temperature compensation routines incorporated into the motor controller and driver unit 21. Further, Hall effect sensors do not operate reliably at elevated temperatures in excess of about 120 degrees Centigrade. While this temperature sensitivity does not adversely affect the operation and reliability of such sensors at relatively low temperatures within the reliable operating range (when combined with the temperature compensation routines), in many applications the environmental temperature to which the motor is subjected frequently exceeds 120 degrees Centigrade. In such a temperature environment, temperature compensation does not guarantee reliable operation of the Hall effect sensors. Consequently, either special cooling techniques must be incorporated into the brushless D.C. motor, or the Hall effect sensor design must be replaced by some other position signal feedback technique. Still further, Hall effect sensors do not function well in dirty environments regardless of temperature considerations, such as applications in which dusty or oily conditions are encountered. In such contaminated environments the only solution has been to periodically clean the interior of the motor.

Figure 3:
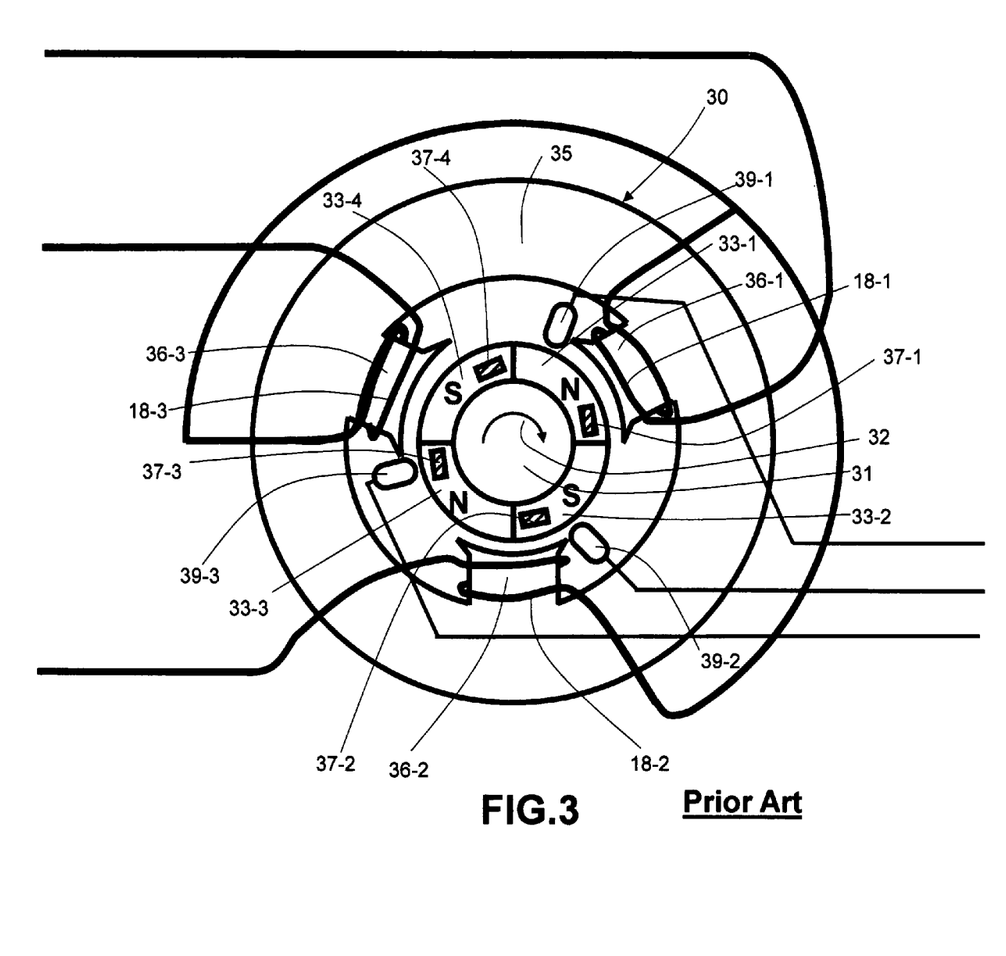
FIG. 3 is a schematic sectional view taken normal to the rotational axis of a brushless D.C. motor used in the '326 system with RFID tag based rotor magnet position sensing.
Figure 4:
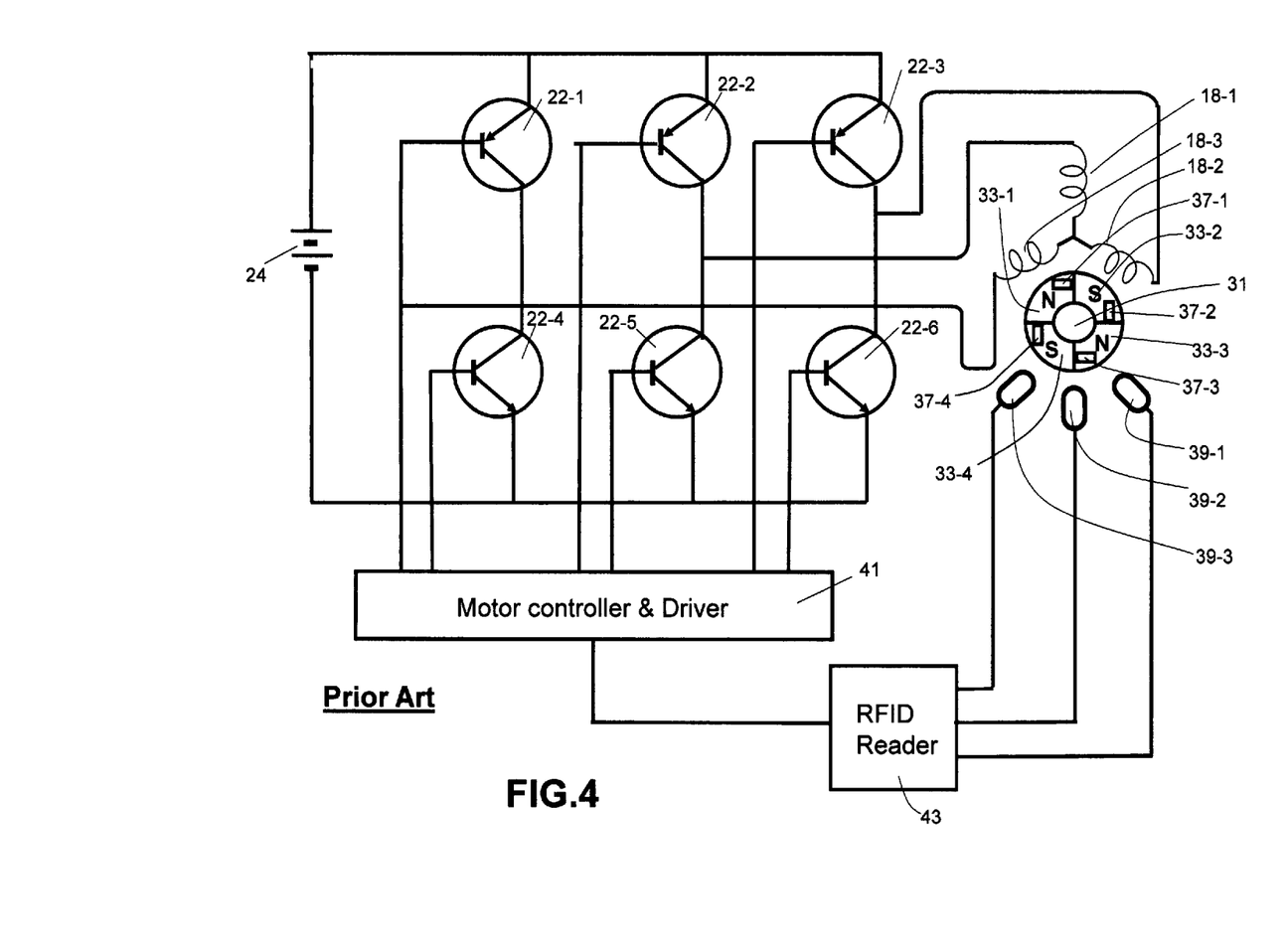
FIG. 4 is a schematic partial block diagram of the power switching and distribution circuitry for the brushless D.C. motor illustrated in FIG. 3.

Commonly assigned U.S. Pat. No. 7,800,326 issued Sep. 21, 2010 for "Brushless D.C. Motor With RFID Rotor Magnet Position Sensing", the disclosure of which is hereby incorporated by reference, discloses an improvement over the above-described conventional rotor position sensing system which eliminates the disadvantages noted above. The '326 system utilizes passive RFID tags mounted on the rotor magnets and associated interrogating antennae mounted on the stator of the motor concentrically of the rotor to provide precise rotor magnet position signals. FIGS. 3 and 4 illustrate the '326 system. FIG. 3 is a sectional view of a first embodiment of the '326 system. As seen in this Fig., a brushless D.C. motor 30 includes a rotor 31 mounted for rotation in a direction suggested by arrow 32. A plurality of permanent magnets 33-1 . . . 33-4 is secured to the outer surface of rotor 31. The magnets 33-1 . . . 33-4 are arranged in alternating magnetic polarities, such that the north pole of magnet 33-1 is flanked by the south poles of magnets 33-2 and 33-4, the south pole of magnet 33-2 is flanked by the north poles of magnets 33-1 and 33-3, etc. Rotor 31 is concentrically mounted within a stator 35 fabricated from a magnetizable material, such as a laminated stack of steel plates, and having a plurality of pole teeth 36-1 . . . 36-3 and a corresponding plurality of axially extending unnumbered slots between pole teeth 36-1 . . . 36-3. Power distribution coils 18-1 . . . 18-3 are individually wound about pole teeth 36-1 . . . 36-3, and these coils are connected in a star configuration to the electrical power source shown in FIG. 4. Rotor 31 is caused to rotate by the proper sequential application of electrical power to coils 18-1 . . . 18-3, which generate magnetic fields capable of interacting with the magnetic fields permanently generated by rotor magnets 33-1 . . . 33-4 to provide rotational force to rotor 31.

Attached to each rotor magnet 33-1 . . . 33-4 is an RFID tag 37-1 . . . 37-4. Each RFID tag 37-1 . . . 37-4 includes a loop antenna and an RFID chip, such as that shown and described in U.S. Pat. No. 6,154,137 issued Nov. 28, 2000, the disclosure of which is hereby incorporated by reference. Generally, an RFID tag has the antenna and the RFID chip mounted on or encapsulated in a thin substrate, such as a polyethylene terephthalate (PET) substrate as disclosed in U.S. Pat. No. 6,373,708 B1 issued Apr. 16, 2002, the disclosure of which is hereby incorporated by reference. The RFID tag is bonded to the associated rotor magnet using a suitable adhesive capable of forming a strong adhesive bond to the magnet surface. The RFID chip may be a commercially available integrated circuit device (such as the μ-chip available from Hitachi Ltd), or a custom-designed integrated circuit device, having the standard internal functional components commonly found in an RFID (radio frequency identification) integrated circuit. Such standard components include an RF and analog section, a CPU, a ROM and an EEPROM (see 1999 IEEE International Solid-State Circuits Conference publication 0-7803-5129-0/99, FIG. 9.1.1: RFID transponder IC block diagram). The RFID chip receives power from interrogation loop antennae 39-1 . . . 39-3 described below when interrogated by an RFID reader, and communicates with the RFID reader using standard protocols, such as the ISO 14443 protocol or the ISO15693 protocol. The size of a standard RFID chip is on the order of 1.4×1.3 mm, with a thickness of about 0.13 mm. The size of the Hitachi μ-chip is 0.4 mm by 0.4 mm. Stored in the EEPROM portion of each RFID chip is an identification character unique to that chip, which in turn provides a unique identification for the magnet on which the RFID tag bearing the chip is mounted.

Each loop antenna 39-1 . . . 39-3 is positioned adjacent an associated one of pole teeth 36-1 . . . 36-3, preferably closely adjacent the leading edge of the associated pole tooth. The leading edge is defined by the direction of rotation of rotor 31, shown as clockwise in FIG. 3. The association between a given loop antenna 39-1 . . . 39-3 and a given pole tooth 36-1 . . . 36-3 is stored in a motor controller and driver 41 described below.

With reference to FIG. 4, which is a schematic partial block diagram of the power switching and distribution circuitry for the brushless D.C. motor illustrated in FIG. 3, each loop antenna 39-1 . . . 39-3 is continuously energized during operation of motor 30 by an RFID reader 43. When a given RFID tag 37-1 . . . 37-4 enters the broadcast field of an antenna 39-1 . . . 39-3, it receives an r.f. interrogation signal, which contains electromagnetic energy sufficient to power up the RFID chip. In response, the RFID tag generates an r.f. signal containing its identification character, which is sensed by the nearby antenna 39-1 . . . 39-3. This sensed character information is coupled to RFID reader 43. The character information received by RFID reader 43 is decoded into digital form and coupled as position signals and rotor magnet identification information to motor controller and driver unit 41. Unit 41 incorporates a microcontroller which processes these feedback signals and uses the positioning information contained therein to control the operation of a bank of power switching transistors 22-1 . . . 22-6 connected as shown, which are used to apply electrical power from a D.C. source (illustrated as a battery 24) to the stator coils 18-1 . . . 18-3. By properly sequencing the application of electrical power to coils 18-1 . . . 18-3, the rotor 31 is caused to rotate at the desired speed, thereby operating the motor.

The use of the combination of RFID tags 37-1 . . . 37-4 mounted on individual rotor magnets 37-1 . . . 37-4, RFID interrogation antennae 39-1 . . . 39-3, and RFID reader 43 affords several advantages over Hall effect based rotor magnet position sensor systems. Firstly, the operating characteristics of the components of RFID tags 37-1 . . . 37-4 and interrogation antennae 39-1 . . . 39-3 are relatively immune to ambient temperature changes. Consequently, temperature compensation routines are usually not required for systems incorporating the '326 techniques. In addition, RFID tag based systems are capable of reliable operation at temperatures up to 250 degrees Centigrade. This upper limit is higher than the maximum working temperature of most brushless D.C. motors. Further, the performance of RFID tag based systems is relatively immune to ambient contamination caused by oil or dirt, thus reducing the need for frequent cleaning of the motor interior attendant with Hall effect based sensor systems.

In addition to the above advantages, the '326 system provides additional improvements to the operation of brushless D.C. motors. Because the r.f. signals generated by RFID tags 37-1 . . . 37-3 contain the unique identification character, the information signals supplied to the motor controller and driver 41 identify the particular rotor magnet entering the operating field of a given power distribution coil 18-1 . . . 18-3. In response, the motor controller and driver 41 can tailor the amount and time of application of electrical power to power distribution coils 18-1 . . . 18-3 to the magnetic field characteristics of the particular magnet entering the operating field of the power distribution coil. This affords much more precise operating conditions for the motor 30, substantially reducing or eliminating entirely any mechanical vibrations caused by less precise power distribution techniques.

In order to calibrate the system, after assembly the motor 30 is operated in a generator mode in which rotor 31 is mechanically rotated in the rotational direction of arrow 32. The emf induced in coils 18-1 . . . 18-3 by the movement of rotor magnets 33-1 . . . 33-4 through the field region of the coils is examined by motor controller and driver 41 and the waveforms are processed to calculate correction factors for each coil-magnet combination. More specifically, the magnetic interaction between a given rotor magnet and a given coil can vary with the strength and distribution of the magnet field produced by the rotor magnet, the physical contour, angular position, and magnetic susceptibility of each pole tooth, and the electro-magnetic characteristics of the coil. The total effect of all of these parameters is evidenced by the emf waveform obtained for each magnet-coil combination when the motor 30 is operated in the generator mode. Any deviation from the ideal waveform can be corrected by using the calculated correction factor when applying power to a given coil-magnet combination. For example, if the angular position of a given pole tooth is offset from the design value (lack of circular symmetry), the electrical power to the corresponding coil can be delayed or advanced (depending on the direction of angular skew) to compensate for this asymmetry. Similarly, if the pole tooth is misshapen, this irregularity will be evidenced by the emf waveform, for which a correction factor can be calculated to compensate for this irregularity. In this way, motor 30 can be operated with increased efficiency approaching the ideal, which results in minimum motor vibrations caused by non-ideal power commutation and distribution and maximum power efficiency.

Figure 5:
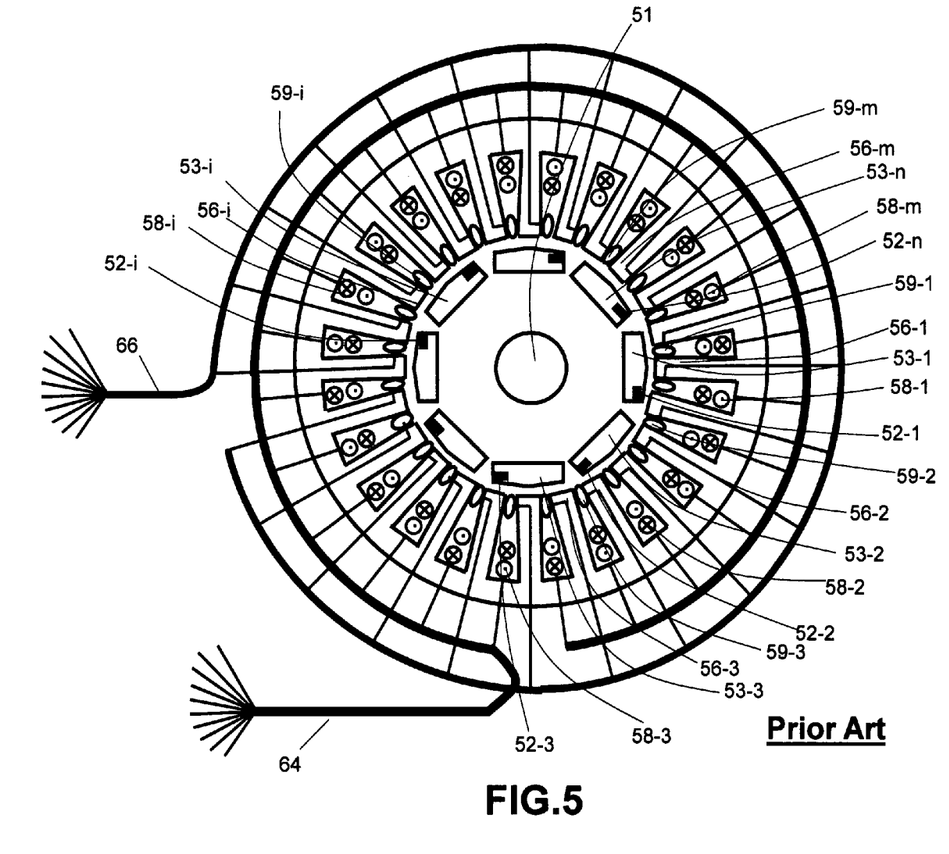
FIG. 5 is a view similar to FIG. 3 illustrating an embodiment of the FIG. 3 motor, having a relatively large number of permanent magnets and magnet position identifiers.
Figure 6:
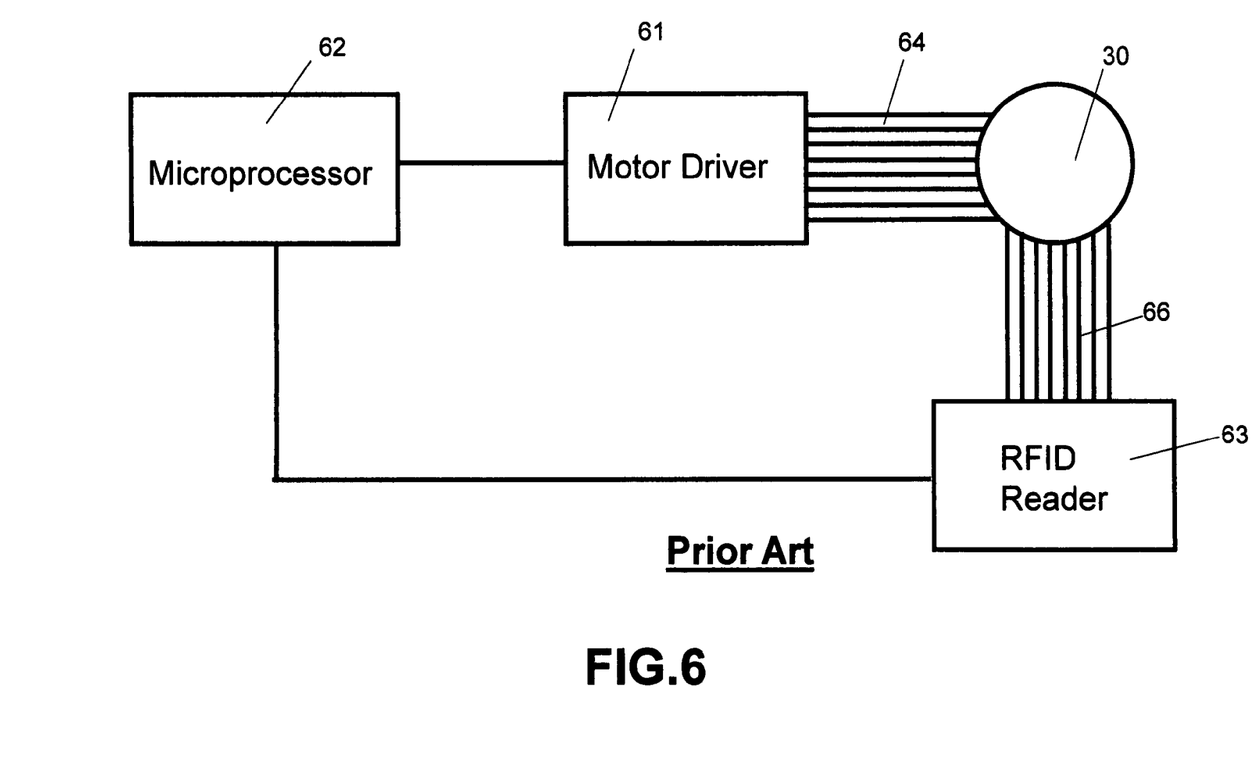
FIG. 6 is a view similar to FIG. 4 showing a block diagram of the power switching and distribution circuitry providing individual power control for the power coils of the embodiment illustrated in FIG. 5.

The embodiment of the '326 system described above with reference to FIGS. 3 and 4 uses the same star configuration for power distribution coils 18-1 . . . 18-3 as that shown in the prior art example of FIGS. 1 and 2. In this configuration, the coils 18-1 , , , 18-3 are interconnected as shown with one terminal of each coil connected in common. Even further efficiencies can be obtained with brushless D.C. motors by connecting the power distribution coils independently to a driver circuit and operating each coil in an independent manner. This embodiment of the '326 system is illustrated in FIGS. 5 and 6. As seen in these Figs., a brushless D.C. motor has a rotor 51 provided with a plurality of rotor permanent magnets 53-$n$. A plurality of RFID tags 52-$n$ is attached to the magnets 53-$n$, with each RFID tag 52-$i$ having a unique identification character stored therein serving to identify the rotor magnet 53-$i$ to which the RFID tag is attached. A plurality of pole teeth 56-$m$ are distributed about the inner circumference of a stator, each pole tooth 56-$i$ having a power coil 58-$i$ associated thereto. A plurality of interrogation antennae 59-$m$ are positioned adjacent each of pole teeth 56-$m$ on a one-to-one basis. Interrogation antennae 59-$m$ are coupled via conductors 66 to an RFID reader 63, which has outputs connected to a microprocessor 62. The outputs from microprocessor 62 supply supervisory and control signals to a motor driver 61. The individual outputs from motor driver 61 are connected individually to power coils 58-$m$ in such as manner as to enable individual application of electrical power to individual coils 58-$m$. More particularly, a pair of conductors from conductor group 64 is coupled to each end of a given power coil 58$i$ so that voltage and current is supplied to each power coil on an individual basis. By enabling the individual application of driving power to the coils 58-$m$, the motor of FIGS. 5 and 6 can be most precisely controlled to optimize the operation of the motor and minimize power consumption and mechanical vibrations caused by power commutation errors inherent in the star configuration arrangement.

Brushless D.C. motor assemblies fabricated according to the teachings of the '326 patent are capable of much more efficient operation than such motors using Hall effect sensors or other rotor magnet position sensors having temperature compensation requirements, limited maximum temperature operating constraints and susceptibility to contaminated environmental conditions. In addition, the rotor magnet identification capability afforded by the use of RFID tags as position sensors provides the additional capability of optimizing the operation of the power distribution circuitry. However, while the '326 system enjoys these advantages it has been discerned that the strength of the r.f. signals detected by the interrogating antennae 39-1, . . . , 39-3; 59-$m$ diminishes with increased rotor speed. At some value of the rotor speed-depending on the physical design of a given motor—these r.f. signals can no longer be reliably detected and processed by the system components. For many motor designs, the maximum speed at which the r.f. signals can be reliably detected is slightly less than 1500 R.P.M. (revolutions per minute). This imposes an upper rotational speed limit at which the motor can be operated, which is undesirable.

SUMMARY OF THE INVENTION

The invention comprises a rotor magnet position feedback technique which has all the advantages of the RFID tag based rotor magnet position feedback technique but which is devoid of the upper rotational speed limit limitation of the RFID tag based rotor magnet position feedback technique.

From an apparatus standpoint, the invention comprises a brushless D.C. motor having a rotor with a surface provided with a plurality of permanent rotor magnets distributed therealong, each rotor magnet having an RF transmitter attached thereto containing a unique identification character serving to identify the rotor magnet; a stator having a plurality of pole teeth separated by axially extending slots, each one of the pole teeth having a power coil wound thereabout; and a plurality of RF receiving antennae each mounted adjacent a different one of the pole teeth for receiving r.f. signals broadcast from the RF transmitter containing the unique identification character when a given one of the RF transmitters is within the reception range of a given one of the receiving antennae, the unique identification signal serving to identify the particular one of the rotor magnets entering the reception range. In the preferred embodiment, adjacent magnets along the rotor surface are arranged with opposite magnetic polarities and the rotor surface is an outer substantially cylindrical surface, with the rotor being configured for rotation within the stator.

Electrical power is supplied to each RF transmitter by a transmitter power generator unit. The transmitter power generator unit comprises at least one electrically conductive coil mounted on the rotor for rotation therewith; and a transmitter power conditioning unit having an input coupled to the at least one coil and an output coupled to each of the RF transmitters. The at least one coil is positioned on the rotor to cut through the magnetic lines of force generated by the stator power coils to induce electrical current in the at least one coil. In the preferred embodiment, a plurality of coils are mounted on the rotor in spaced fashion with all such coils electrically interconnected.

A plurality of RF receiver units are each coupled to an associated different one of the RF receiving antennae for processing the received r.f. transmitter signals. The processed signals are coupled to a microprocessor for decoding the unique identification characters, the microprocessor having an output for manifesting the unique identification characters, and a motor controller and driver unit has an input for receiving the unique identification characters and an output for providing power coil driving signals at least partially dependent upon the unique identification characters.

In one embodiment, the power coils are connected in a star configuration. In an alternate embodiment, each power coil is individually coupled to the motor controller and driver unit to enable individual application of power to each of the power coils.

From a system standpoint, the invention comprises a brushless D.C. motor having a rotor with a surface provided with a plurality of permanent rotor magnets distributed therealong, each rotor magnet having an RF transmitter attached thereto containing a unique identification character serving to identify the rotor magnet; a stator having a plurality of pole teeth separated by axially extending slots, each one of the pole teeth having a power coil wound thereabout; and a plurality of RF receiving antennae each mounted adjacent a different one of the pole teeth for receiving r.f. signals broadcast from the RF transmitter containing the unique identification character when a given one of the RF transmitters is within the reception range of a given one of the receiving antennae, the unique identification signal serving to identify the particular one of the rotor magnets entering the reception range. In the preferred embodiment, adjacent magnets along the rotor surface are arranged with opposite magnetic polarities and the rotor surface is an outer substantially cylindrical surface, with the rotor being configured for rotation within the stator.

Electrical power is supplied to each RF transmitter by a transmitter power generator unit. The transmitter power generator unit comprises at least one electrically conductive coil mounted on the rotor for rotation therewith; and a transmitter power conditioning unit having an input coupled to the at least one coil and an output coupled to each of the RF transmitters. The at least one coil is positioned on the rotor to cut through the magnetic lines of force generated by the stator power coils to induce electrical current in the at least one coil. In the preferred embodiment, a plurality of coils are mounted on the rotor in spaced fashion with all such coils electrically interconnected.

A plurality of RF receiver units are each coupled to an associated different one of the RF receiving antennae for processing the received r.f. transmitter signals. The processed signals are coupled to a microprocessor for decoding the unique identification characters, the microprocessor having an output for manifesting the unique identification characters, and a motor controller and driver unit has an input for receiving the unique identification characters from the microprocessor and an output for providing power coil driving signals at least partially dependent upon the unique identification characters.

In one embodiment, the power coils are connected in a star configuration. In an alternate embodiment, each power coil is individually coupled to the motor controller and driver unit to enable individual application of power to each of the power coils.

By using internally powered r.f. transmitters instead of RFID tags the invention provides a rotor magnet position feedback technique which has all the advantages of the RFID tag based rotor magnet position feedback technique but which is devoid of the upper rotational speed limit limitation of the RFID tag based rotor magnet position feedback technique. As a consequence, the range of application of motors incorporating the invention is greatly enlarged.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 7:
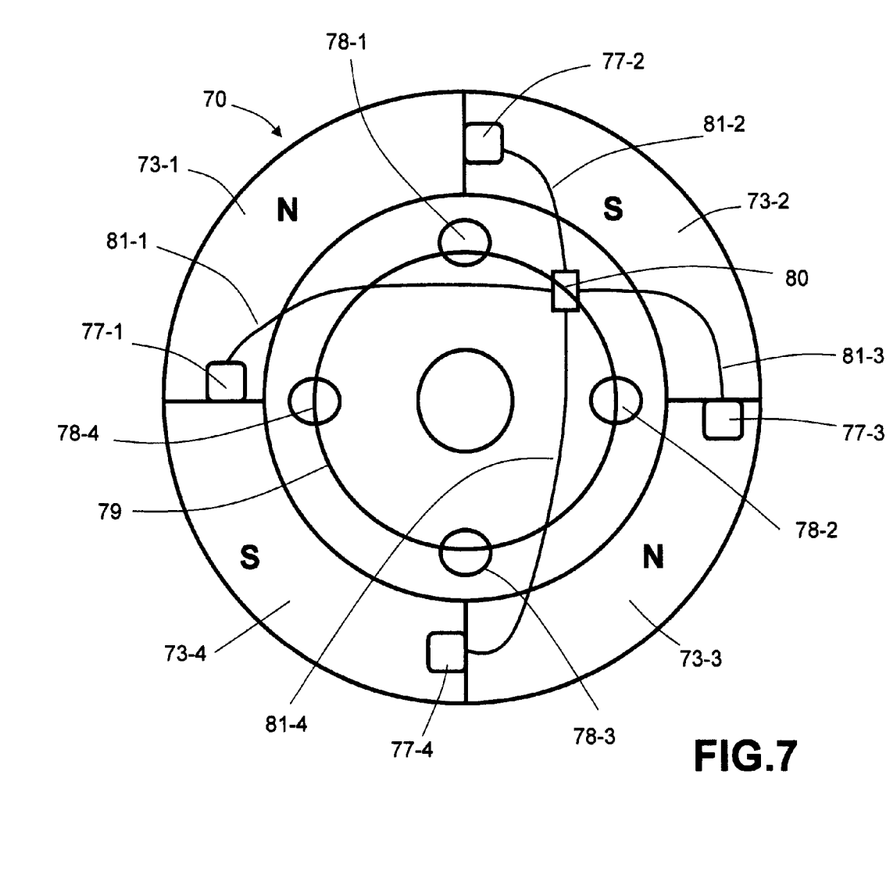
FIG. 7 is a schematic end view of a rotor in a motor incorporating the invention.

Turning now to the drawings, FIG. 7 is a schematic end view of an embodiment of a rotor in a motor incorporating the invention. As seen in this Fig., a rotor 70 designed for rotatable mounting in a stator of the type shown in FIG. 3 includes a plurality of permanent magnets 73-1 . . . 73-4 secured to the outer surface of rotor 70. The direction of rotation of rotor 70 is illustrated as clockwise as suggested by the central curved arrow shown in the Fig. The magnets 73-1 . . . 73-4 are arranged in alternating magnetic polarities, such that the north pole of magnet 73-1 is flanked by the south poles of magnets 73-2 and 73-4, the south pole of magnet 73-2 is flanked by the north poles of magnets 73-1 and 73-3, etc. Rotor 70 is designed to be concentrically mounted within a stator (such as stator 35 of FIG. 3) fabricated from a magnetizable material, such as a laminated stack of steel plates, and having a plurality of pole teeth 36-1 . . . 36-3 and a corresponding plurality of axially extending unnumbered slots between pole teeth 36-1 . . . 36-3. Power distribution coils 18-1 . . . 18-3 are individually wound about pole teeth 36-1 . . . 36-3, and these coils are connected in a star configuration to the electrical power source shown in FIGS. 4 and 9. Rotor 70 is caused to rotate by the proper sequential application of electrical power to coils 18-1 . . . 18-3, which generate magnetic fields capable of interacting with the magnetic fields permanently generated by rotor magnets 73-1 . . . 73-4 to provide rotational force to rotor 70.

Attached to each rotor magnet 73-1 . . . 73-4 is an RFID transmitter 77-1 . . . 77-4. Each RFID transmitter 77-1 . . . 77-4 includes a loop antenna and an RFID transmitter chip, such as a type ZF RF module available from Murata Manufacturing Company of Kyoto, Japan, a mini RF transmitter module available from DealExtreme company of Hong Kong, or an equivalent device. The RF transmitter chip and antenna are bonded to the associated rotor magnet using a suitable adhesive capable of forming a strong adhesive bond to the magnet surface. The RF transmitter chip incorporates the standard internal functional components commonly found in an RF module. Such standard components include an RF and analog section, a CPU, a ROM and an EEPROM (see 1999 IEEE International Solid-State Circuits Conference publication 0-7803-5129-0/99, FIG. 9.1.1: RFID transponder IC block diagram). Each RF transmitter has stored in its memory device a unique identification character serving to identify the rotor magnet to which it attached. Thus, when powered up and operating, each transmitter continuously broadcasts an RF signal containing the unique identification character which identifies the rotor magnet to which it is attached.

Figure 8:
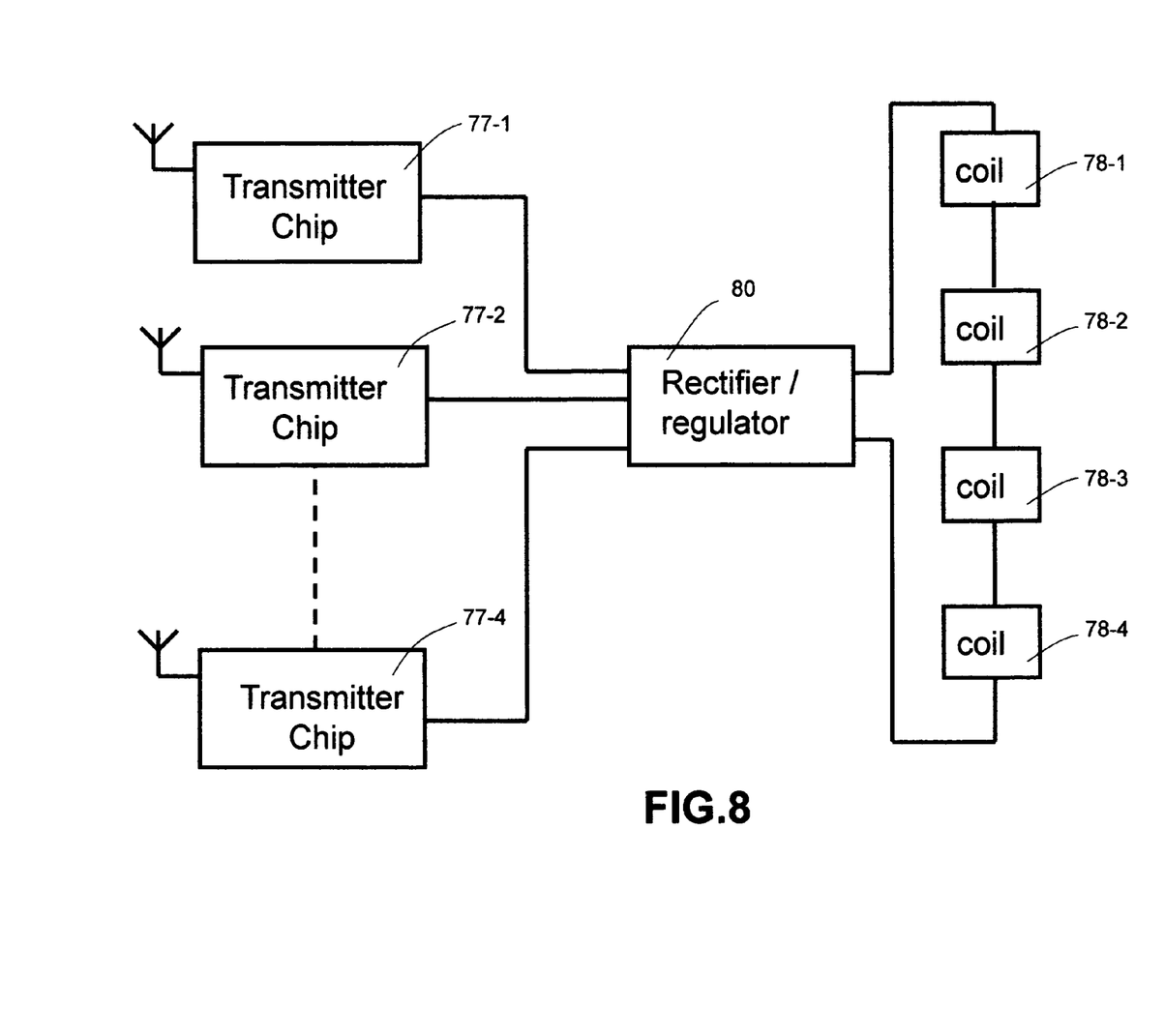
FIG. 8 is a block diagram showing the transmitter power generating circuit according to the invention.

Unlike the RFID tags used in the '326 system, RF transmitters 77-1 . . . 77-4 are active devices which require a continuous source of D.C. electrical power. FIG. 8 is a block diagram showing the transmitter power generating circuit. Electrical power is supplied by a plurality of transmitter electrical power coils 78-1, 78-2, . . . , 78-4 in the embodiment shown in FIGS. 7 and 8. Coils 78-1, . . . , 78-4 are ohmically interconnected by a conductor 79. Interconnecting conductor 79 is also ohmically connected to a conventional D.C. power conditioning unit 80, which incorporates a rectifier and a D.C. voltage regulator to supply a steady stream of D.C. voltage to the transmitters 77-1, . . . , 77-4.

In use, as rotor 70 rotates within stator 35, coils 78-1, . . . , 78-4 cut the magnetic lines of force generated by the stator power coils 18-1, . . . , 18-3. This induces an electrical current in coils 78-1, . . . , 78-4, which is fed to power conditioning unit 80. The output of power conditioning unit 80 is supplied to each of transmitters 77-1, . . . , 77-4 by means of ohmic conductors 81-1, . . . , 81-4 which are ohmically connected between the respective transmitter and power conditioning unit 80. Thus, so long as rotor 70 is rotating, power is continuously supplied to transmitters 77-1, . . . , 77-4 and the respective RF signals containing the unique identification characters are continuously broadcast.

Figure 9:
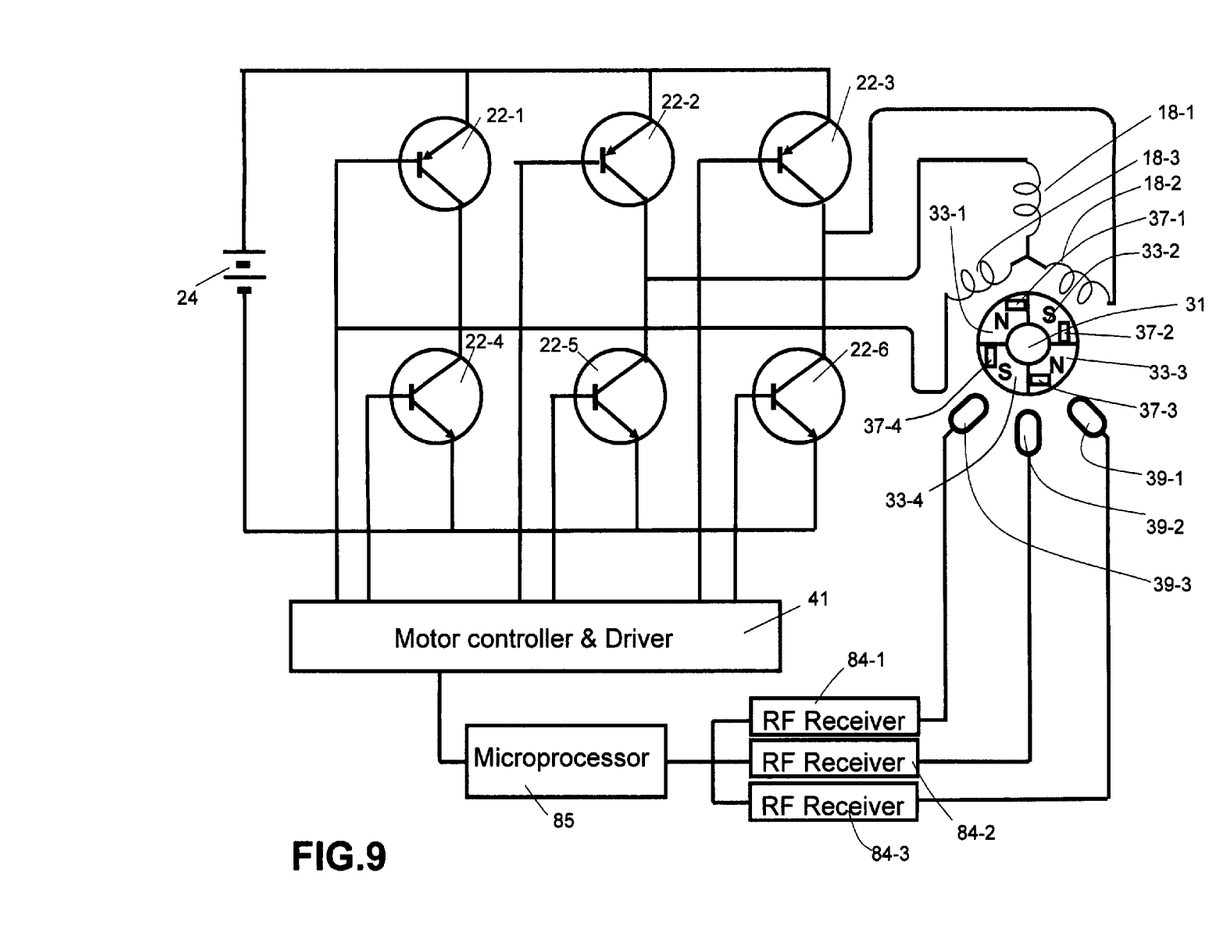
FIG. 9 is a schematic partial block diagram of the power switching and distribution circuitry for the brushless D.C. motor incorporating the rotor illustrated in FIG. 7.

In order to utilize the broadcast RF signals to control the application of electrical power to the stator power coils 18-1, . . . , 18-3, a modified version of the power switching and distribution circuitry shown in FIG. 4 is employed. As seen in FIG. 9, the RFID reader 43 is replaced by conventional RF receiver modules 84-1, . . . , 84-3, which are connected to the loop antennae 39-1, . . . , 39-3 on a one-to-one basis; and a microprocessor 85 for processing the unique character identification information. The RF receiver modules 84-1, . . . , 84-3 communicate with the rotor transmitters 77-1, . . . , 77-4 using standard protocols, such as the ISO 14443 protocol or the ISO15693 protocol, and condition the received RF signals by amplification (as necessary); the microprocessor 85 extracts the unique identification character information and operates the motor controller and driver 41 in the manner described above.

Each loop antenna 39-1 . . . 39-3 is positioned adjacent an associated one of pole teeth 36-1 . . . 36-3, preferably closely adjacent the leading edge of the associated pole tooth. The leading edge is defined by the direction of rotation of rotor 70, shown as clockwise in FIG. 7. The association between a given loop antenna 39-1 . . . 39-3 and a given pole tooth 36-1 . . . 36-3 is stored in motor controller and driver 41 described below.

With reference to FIG. 9, each loop antenna 39-1 . . . 39-3 is operational during operation of motor 30. When a given RF transmitter 77-1, . . . , 77-4 enters the reception field of an antenna 39-1 . . . 39-3, the RF signal containing its identification character is sensed by the nearby antenna 39-1 . . . 39-3. This sensed identification character information is coupled to the associated RF receiver module 84-1, . . . , 84-3. The character information received by each RF receiver module is conditioned and supplied to the microprocessor 85, which decodes the signal into digital form, processes the information into magnet position signals and rotor magnet identification information, and supplies the result to motor controller and driver unit 41. Unit 41 incorporates a microcontroller which processes these feedback signals and uses the positioning information contained therein to control the operation of a bank of power switching transistors 22-1 . . . 22-6 connected as shown, which are used to apply electrical power from a D.C. source (illustrated as a battery 24) to the stator coils 18-1 . . . 18-3. By properly sequencing the application of electrical power to coils 18-1 . . . 18-3, the rotor 31 is caused to rotate at the desired speed, thereby operating the motor.

Figure 10:
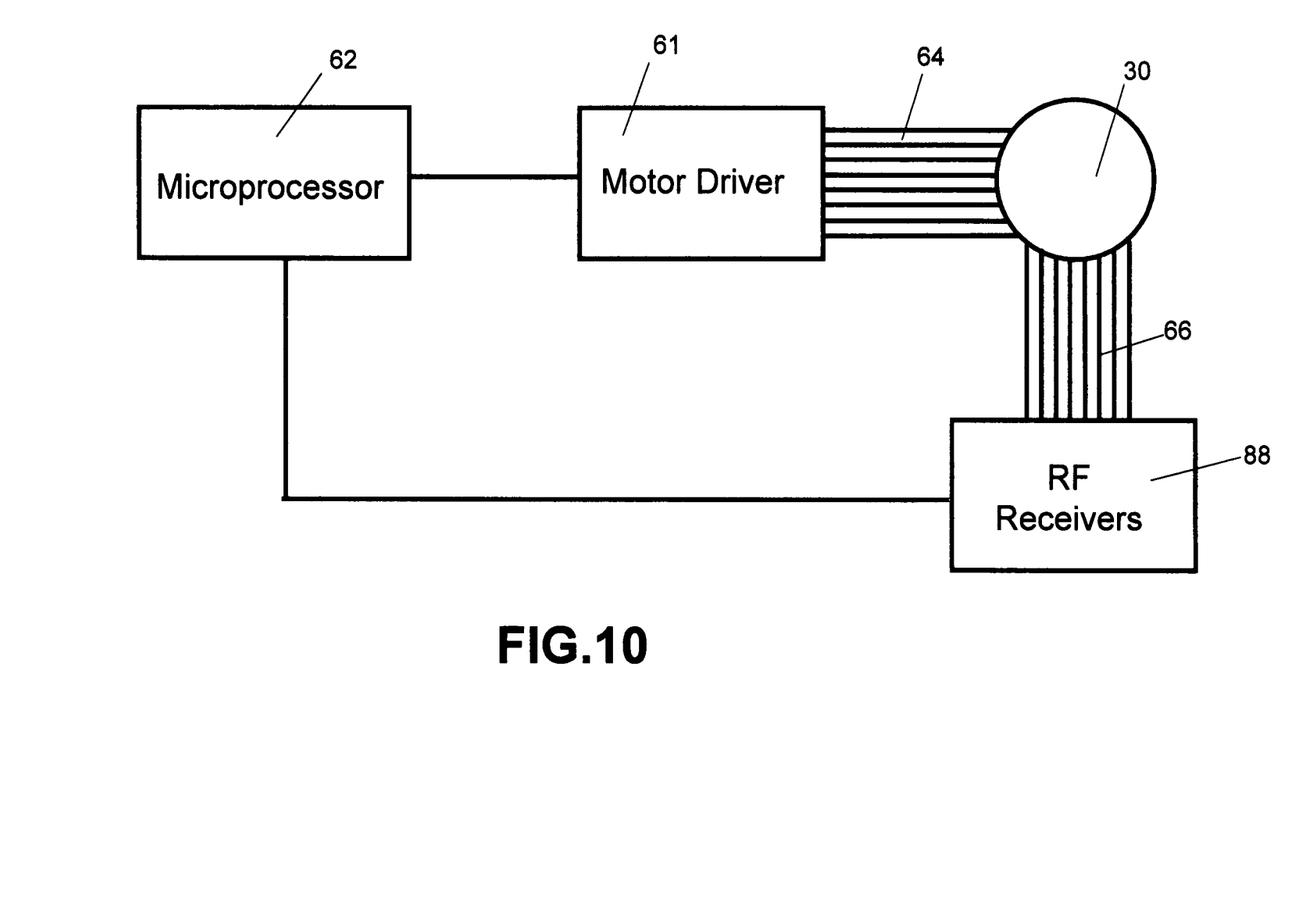
FIG. 10 is a view similar to FIG. 9 showing a block diagram of the power switching and distribution circuitry providing individual power control for the power coils of a motor incorporating the invention.

The use of the combination of RF transmitters 77-1, . . . , 77-4 mounted on individual rotor magnets 73-1 . . . 73-4, RF receiving antennae 39-1 . . . 39-3, and RF receiver modules 84-1, . . . , 84-3 affords all of the advantages of the '326 system but does not suffer from the upper rotational speed limit. Calibration of the system of the present invention is performed in the same manner as with the '326 system. Also, the present invention may be employed using the power switching and distribution circuitry shown in FIG. 6 providing individual power control for the power coils of the brushless D.C. motor. The modification to the FIG. 6 circuitry is shown in FIG. 10 and consists in replacing the RFID reader with a plurality of RF receivers 88.

As will now be apparent, brushless D.C. motor assemblies fabricated according to the teachings of the invention enjoy all the advantages of the '326 system without the rotor upper speed limitation.

While the invention has been described with reference to particular embodiments, various modifications, alternate constructions and equivalents may be employed without departing from the spirit of the invention. For example, while the embodiments illustrated and described are directed to a motor construction in which the rotor is positioned internal to the surrounding stator, the principles of the invention apply with equal force to the reverse configuration in which the stator is positioned internal to a surrounding rotor. In such a configuration, the rotor magnets are distributed about an inner mounting surface of the rotor, along with the RF transmitters, and the pole teeth, power coils and interrogation antenna are distributed about an outer surface of the stator. Therefore, the above should not be construed as limiting the invention, which is defined by the appended claims.

What is claimed is:

1. A brushless D.C. motor comprising:
   a rotor with a surface provided with a plurality of permanent rotor magnets distributed therealong, each rotor magnet having an RF transmitter attached thereto containing a unique identification character serving to identify the rotor magnet;
   a stator having a plurality of pole teeth separated by axially extending slots, each one of the pole teeth having a power coil wound thereabout;
   a plurality of RF receiving antennae each mounted adjacent a different one of said pole teeth for receiving r.f. signals broadcast from an RF transmitter containing the unique identification character when a given one of the RF transmitters is within the reception range of a given one of the receiving antennae, the unique identification signal serving to identify the particular one of the rotor magnets entering said reception range; and,
   a transmitter power generator unit comprising at least one electrically conductive coil mounted on said rotor for rotation therewith, and a transmitter power conditioning unit having an input coupled to the at least one coil and an output coupled to each of the RF transmitters for supplying electrical power thereto, said at least one coil being positioned on the rotor to cut through magnetic lines of force generated by the stator power coils to induce electrical current in the at least one coil.

2. The invention of claim 1 wherein said transmitter power generating unit includes a plurality of mutually interconnected electrically conductive coils mounted on said rotor.

3. The invention of claim 1 wherein adjacent magnets along said rotor surface are arranged with opposite magnetic polarities.

4. The invention of claim 3 wherein said rotor surface is an outer substantially cylindrical surface, and said rotor is configured for rotation within said stator.

5. The invention of claim 1 further including a plurality of RF receiver units each coupled to an associated different one of said RF receiving antennae for processing the received r.f. transmitter signals.

6. The invention of claim 5 further including a microprocessor having an input coupled to said plurality of RF receiver units for receiving the processed signals and for decoding said unique identification characters, said microprocessor having an output for manifesting said unique identification characters.

7. The invention of claim 6 further including a motor controller and driver unit having an input coupled to said output of said microprocessor for receiving said unique identification characters and an output for providing power coil driving signals at least partially dependent upon said unique identification characters.

8. The invention of claim 1 wherein said power coils are connected in a star configuration.

9. The invention of claim 7 wherein each said power coil is individually coupled to said motor controller and driver unit to enable individual application of power to each of said power coils.

10. A brushless D.C. motor system comprising:
a rotor with a surface provided with a plurality of permanent rotor magnets distributed therealong, each rotor magnet having an RF transmitter attached thereto containing a unique identification character serving to identify the rotor magnet;
a stator having a plurality of pole teeth separated by axially extending slots, each one of the pole teeth having a power coil wound thereabout;
a plurality of RF receiving antennae each mounted adjacent a different one of said pole teeth for receiving r.f. signals broadcast from an RF transmitter containing the unique identification character when a given one of the RF transmitters is within the reception range of a given one of the receiving antennae, the unique identification signal serving to identify the particular one of the rotor magnets entering said reception range;
a transmitter power generator unit comprising at least one electrically conductive coil mounted on said rotor for rotation therewith, and a transmitter power conditioning unit having an input coupled to the at least one coil and an output coupled to each of the RF transmitters for supplying electrical power thereto, said at least one coil being positioned on the rotor to cut through magnetic lines of force generated by the stator power coils to induce electrical current in the at least one coil,
a plurality of RF receiver units each coupled to an associated different one of said RF receiving antennae for processing the received r.f. transmitter signals,
a microprocessor having an input coupled to said plurality of RF receiver units for receiving the processed signals and for decoding said unique identification characters, said microprocessor having an output for manifesting said unique identification characters, and
a motor controller and driver unit having an input coupled to said output of said microprocessor for receiving said unique identification characters and an output for providing power coil driving signals at least partially dependent upon said unique identification characters.

11. The invention of claim 10 wherein said transmitter power generating unit includes a plurality of mutually interconnected electrically conductive coils mounted on said rotor.

12. The invention of claim 10 wherein adjacent magnets along said rotor surface are arranged with opposite magnetic polarities.

13. The invention of claim 10 wherein said rotor surface is an outer substantially cylindrical surface, and said rotor is configured for rotation within said stator.

14. The invention of claim 10 wherein said power coils are connected in a star configuration.

15. The invention of claim 10 wherein each said power coil is individually coupled to said motor controller and driver unit to enable individual application of power to each of said power coils.

16. A method of initially calibrating a brushless D.C. motor after assembly, the motor having a rotor provided with a plurality of rotor magnets distributed along a surface thereof, each rotor magnet having an RF transmitter attached thereto containing a unique identification character serving to identify the rotor magnet, and a transmitter power generator having at least one coil mounted on the rotor and a transmitter power conditioning unit coupled to the at least one coil and to each of the RF transmitters; a stator having a plurality of pole teeth separated by axially extending slots, each one of the pole teeth having a power coil wound thereabout; a plurality of RF receiver antennae each mounted adjacent a different one of the pole teeth for receiving r.f. signals from each of the transmitters, and a plurality of RF receivers each coupled to a different one of the RF receiver antennae, said method comprising the steps of:
(a) generating an emf in the power coil of at least some of the pole teeth by rotating the rotor;
(b) correlating the identity of each rotor magnet responsible for the generation of the emf in step (a);
(c) examining each emf waveform generated in step (a);
(d) comparing each waveform with a standard waveform; and
(e) computing a correction factor correlated to rotor magnet identity and power coil identity.

17. The method of claim 16 further including the step (f) of using the correction factor computed in step (e) to control the application of power to a given power coil when the corresponding rotor magnet is positioned in the magnetic range of the given power coil during operation of the motor.

* * * * *

UNITED STATES PATENT AND TRADEMARK OFFICE
CERTIFICATE OF CORRECTION

PATENT NO. : 9,667,122 B1
APPLICATION NO. : 14/757164
DATED : May 30, 2017
INVENTOR(S) : Zhu et al.

It is certified that error appears in the above-identified patent and that said Letters Patent is hereby corrected as shown below:

On the Title Page

Item (73) Assignee change "SILICON VALLEY MICROM CORPORATION" to --SILICON VALLEY MICRO M CORPORATION--

Signed and Sealed this
Third Day of October, 2017

Joseph Matal
*Performing the Functions and Duties of the*
*Under Secretary of Commerce for Intellectual Property and*
*Director of the United States Patent and Trademark Office*